July 21, 1931.   O. W. DUNHAM   1,815,292
ELEVATOR PIT BEARING
Filed June 12, 1928
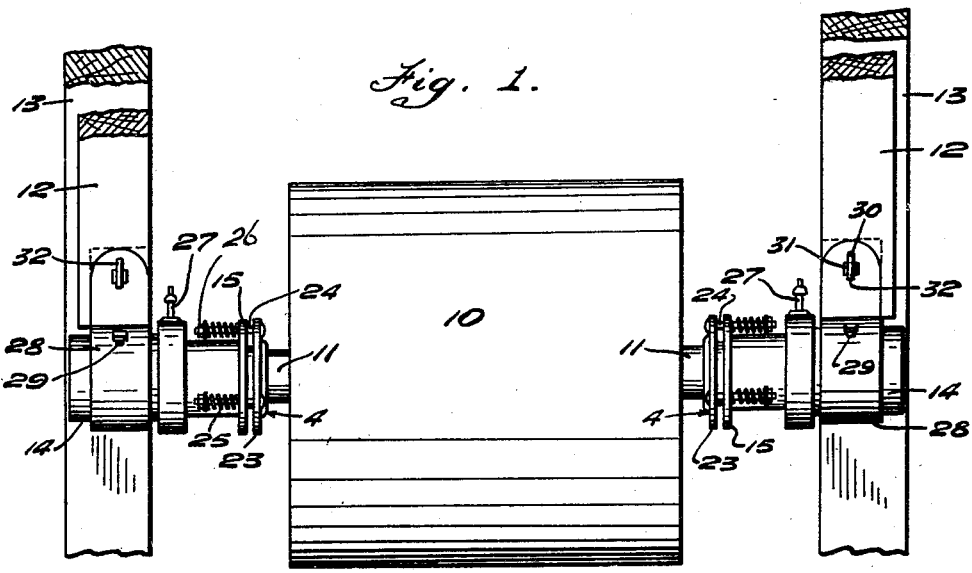
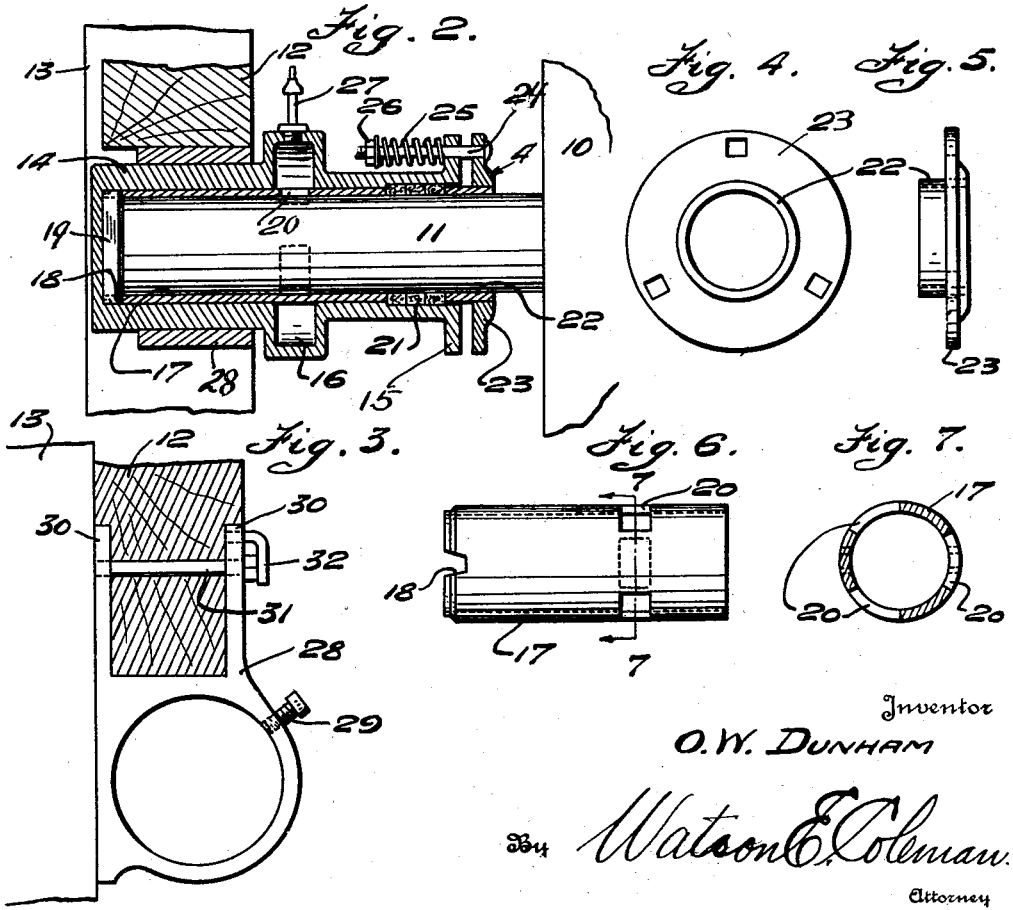
Inventor
O. W. DUNHAM
By Watson E. Coleman
Attorney Patented July 21, 1931

1,815,292

UNITED STATES PATENT OFFICE

ORSON W. DUNHAM, OF WEBB CITY, MISSOURI, ASSIGNOR TO DUNHAM BEARING & MANUFACTURING CO., OF WEBB CITY, MISSOURI, A BUSINESS TRUST

ELEVATOR PIT BEARING

Application filed June 12, 1928. Serial No. 284,712.

This invention relates to bearings used for supporting the lower pulley of endless elevators disposed in very narrow pits and which handle sand or gravel and wherein the bearing is likely to come in contact with water, sand and grit. Elevators of this character are quite narrow and the shaft of the lower pulley of such elevators is usually urged downward to keep the elevator belt taut by means of jacks mounted on guides nailed to the side of the elevator frame, the jacks being movable downward and at their lower ends being formed with V-shaped notches engaging the shaft of the lower pulley. These jacks are urged downward by wedges or like means and the bearing of the shaft in the V-shaped notch in the lower end of the jack timbers, particularly in view of the amount of grit present at this point, very shortly tends to cut away or wear away the ends of the shaft.

The general object of the present invention is to provide a very simple bearing which may be readily mounted upon the lower ends of such jacks without in any way changing the standard equipment for elevators of this character.

A further object is to provide a construction of this character wherein the shaft of the pulley is mounted in a bearing which in turn is mounted in a jack socket detachably connected with the jack, the jack socket being provided with means whereby the bearing may be rotatably adjusted in the socket so as to permit the bearing to be rotated into a plurality of different positions when the bearing has become worn in one position.

A further object is to provide a device of this character having a self-adjusting stuffing box and Babbitt gland so constructed that the Babbitt gland may be shifted with the hub of the bearing to a new bearing seat, thus providing for the wearing out of three bearing seats and three flange seats before a new Babbitt tube or sleeve is required for the interior of the bearing.

A still further object is to provide a bearing of this character which is very simple, has relatively few parts, and which will positively prevent the entrance of either water or grit into the interior of the bearing.

My invention is illustrated in the accompanying drawings, wherein:—

Figure 1 is a front elevation of a pit pulley and bearing constructed in accordance with my invention;

Figure 2 is a longitudinal sectional view through one of the bearings;

Figure 3 is a fragmentary vertical section through the jack socket and a portion of the slide;

Figure 4 is a front elevation;

Figure 5 is an edge elevation of the packing gland and flange;

Figure 6 is a side elevation of the Babbitt metal sleeve;

Figure 7 is a section on the line 7—7 of Figure 6.

Referring to the drawings, 10 designates a pulley mounted upon a shaft 11, the ends of the shaft extending into bearings, as will be later stated, and these bearings being suspended in the pit by means of wooden jacks or slides 12 which extend down from above inside of the elevator opening and operated by levers from above in any suitable manner, these slides being associated with and being movable longitudinally on the vertical members 13 shown in Figure 1. Associated with each end of the shaft 11 is an approximately cylindrical hub or tube 14 closed at its outer end and at its inner end formed with the outwardly projecting annular flange 15. Intermediate this flange and the end of the tube 14 is formed the enlarged annular grease chamber 16.

It will be understood that the jacks 12 are constantly urged downward or forced downward by the levers heretofore referred to, this construction not being shown, however, because it is the common and standard construction for the pit bearings of elevators.

Disposed within the tube 14 and fitting the same and fitting the shaft 11 is a tube or sleeve 17 of Babbitt metal which has a length less than that of the tubular hub 14 and at its outer end, that is the end adjacent the outer end of the hub 14, is formed with notches 18 which engage with lugs 19 on the inner face of the end of the hub, these lugs acting to prevent the sleeve 17 from turning. At a point directly in line with the grease chamber 16 the sleeve 17 is formed with a plurality of openings 20 disposed equi-distantly around the tube or sleeve, these holes 20 permitting lubricant, such as oil or grease, to pass from the chamber 16 to the shaft 11.

Disposed within the inner end of the tubular hub 14 are packing rings 21 which fill the space between the shaft 11 and the tubular hub 14 and these are forced tightly into place by the packing gland 22 carried by a cast iron flange 23. This may be forced toward the packing 21 by means of bolts 24 passing through the flange 15 and through the flange 23. Springs 25 engage against the flange 15 and the nuts 26 on the bolts and thus automatically take up on the packing 21. At a plurality of points on the lubricant chamber 16 there are provided nipples 27 which may be engaged with an alemite oiler so that grease can be forced in at any point. These nipples are preferably located equi-distantly around the chamber 16 and preferably there are three of these nipples so that the grease can be forced in at any one of three separate points.

Mounted upon the slides 12 is the jack socket, designated generally 28. Each jack socket receives the corresponding tubular hub 14 and the tubular hub is held in any rotatably adjusted position within the jack socket by means of a set screw 29. The jack socket is formed with the two spaced jaws 30, between which the lower end of the slide or jack 12 is received, and these jaws are held to the slide by means of the pin 31 slipped in from the front side and held in place by the pivoted latch 32.

Attention is called to the fact that the tubular hub 14 is turned on its inside and the Babbitt tube or sleeve 17 is made in molds so that it will fit snugly both the hub and the shaft. The gland 22 is also babbitted. The hub may be rotated to any desired rotatably adjusted position and then held by the set screw 29, and the gland is also, of course, rotated with the hub to thus provide for changes in position of the hub and Babbitt gland so as to provide new bearing seats. Three new bearing seats may thus be provided with the construction illustrated before a new tube is required.

The inner end of the bearing hub 14 is normally abutted against the side timber of the elevator supporting structure as illustrated in my Patent No. 1,541,124 of June 9, 1925. It will likewise be seen from this patent that the pulley which is mounted upon the lower shaft of the pit bearing extends laterally outward so as to largely protect the bearing hub from the sand or gravel. The pulley 10 in the instant case may be laterally extended in the same manner for this purpose or the bearing may be otherwise covered as with a piece of belting in order to protect it from the grit and sand.

It will be noted that the oil chamber 16 is disposed just inward of that portion of the bearing hub which extends through the jack socket 28. Obviously the oil chamber could not well be disposed under the jack as a large oil chamber would require considerable room and this would make the bearing cumbersome. If the chamber is located just to the side of the jack and the bearing takes the jack weight at one end of the hub, then the extra weight of the oil chamber will put the bearing out of balance. To overcome this, I provide a space between the jack socket and the oil chamber and the stuffing box. I have found in actual use that without this space to one side of the bearing proper or between the bearing and the chamber, the weight of the chamber will sag the bearing at the outer end and destroy the packing quickly. Obviously the chamber cannot be disposed at the exterior end of the bearing hub inasmuch as the bearing is designed to abut against the end of the elevator frame at the pressure end of the bearing.

I have also found in actual practice that the bushing in the instant bearing can be entirely cut to pieces and yet will stay in place because of the fact that the bearing is held from any possible outward movement by the packing gland 22 carried by the ring 23 and forced inward by the springs 25. It is also to be noted that the apertures 20 as shown in Figure 6 are rectangular in form. I have experimented with circular apertures in a bushing and I find that they will not feed the oil properly especially when it is necessary to use hard oil. For hard oil and for a proper feeding lubricant, there must be an opening directly over the shaft of sufficient area and rectangular in form so that the oil will "bed" on the shaft itself. Otherwise there is likelihood of the hard oil bridging over the opening and the oil is likely to burn out. The packing 21 must consist of at least three rings of best possible packing under compression to take up the wear and hold the air in and the sand and water out.

The mere ordinary felt packing will not do the work. As before remarked, hundreds of mills in mining districts use elevators of this character, which elevators have been standardized and all use jacks bearing at their lower ends against the lower pulley shaft and urging this shaft downward so as to keep the cup supporting belt taut. My structure does not in any way change the standard equipment as all it is necessary to do is to cut the jack off square and bore a hole through the jack for the passage of the bolt 31 and if necessary reduce the thickness of the jack to bring the flanges of the jack socket flush with the faces of the jack timber. I have provided a bearing which is particularly economical in installation and which secures much longer service than other bearings which can possibly be used with these jacks. My bearing can be readily installed at a minimum of cost. It can, at any time, be readily adjusted by loosening the set screws 29 and rotating each bearing within its jack socket so as to bring a new surface to resist the upward pull of the belt upon the shaft. This is particularly necessary in bearings which are disposed at the lower ends of deep pits, some of them being over seventy feet in length, the lower ends of the pits being often filled with gravel, water, and sand. A workman adjusting these bearings has only to loosen one set screw and rotate the bearing so as to bring a new bearing surface in place and then tighten up the set screw and the adjustment is completed for another relatively long period. The packing in my bearing is protected against the action of sand and being under compression and so protected by the closely fitting gland 22, the sand cannot get into the bearing. In one case out of a large number of installations of this bearing, I found that sand had got past the packing and crowded into the oil chamber, but in this case the sand pushed the grease up against the other side of the oil chamber and the load part of the bearing was entirely protected, thus keeping the bearing intact until the hole was discovered.

I claim:—

1. A shaft bearing comprising a tubular hub closed at one end having an annular lubricant-containing chamber inward of the closed end of the hub, a Babbitt metal sleeve disposed within and fitting the hub and having a plurality of openings in alignment with the chamber, means for holding the sleeve from rotation with reference to the hub, a packing gland at one end of the hub and sleeve, and means for supporting the tubular hub so that it may be rotatively adjusted upon the shaft into a plurality of different positions.

2. The combination with a conveyor pulley adapted to be disposed in a pit and a shaft extending through the pulley and rotating therewith, of means supporting the shaft comprising two bearings, one at each end of the shaft, each bearing comprising a tubular hub closed at its outer end, a flange at its inner end, the hub intermediate its ends being formed with an annular lubricant-containing chamber, a sleeve fitting the shaft and hub, the sleeve being formed of Babbitt metal and having means engaging the hub to prevent independent rotation of the sleeve with relation to the hub, the sleeve terminating short of the inner end of the hub and having a plurality of apertures aligning with said chamber, packing disposed within the hub and bearing against the sleeve, a Babbitt metal packing gland surrounding the shaft and bearing against the packing and inserted within the inner end of the hub, the packing gland having a flange, and means resiliently engaging the first named flange and the packing gland flange and urging the packing gland and its flange toward the hub.

3. A shaft bearing comprising a tubular hub closed at one end and having a flange at its other end, the hub being formed with an annular chamber intermediate its ends, a Babbitt metal sleeve fitting the interior of the hub and adapted to fit the shaft and formed with a plurality of rectangular openings aligning with said chamber, the sleeve being engaged at its outer end with the hub against independent rotation, packing disposed within the hub and against the end of the sleeve, means for compressing the packing comprising a Babbitt metal gland adapted to fit the shaft and insertible into the end of the hub and having a flange, bolts passing through the last and first named flanges, and springs engaging the bolts and urging the flanges toward each other.

4. In a pit bearing for elevators, supporting members, slides mounted thereon, socket members mounted upon the slides, tubular hubs disposed within the socket members and closed at their outer ends and a flange at their inner ends, each hub being formed with an annular outwardly projecting lubricant chamber disposed inward of the corresponding socket, a sleeve of Babbitt metal fitting the shaft and fitting the interior of the hub and engaged with the hub against independent rotation, the sleeve having a plurality of equally spaced openings in alignment with the chamber and terminating short of the inner end of the hub, packing disposed within the inner end of each hub, a packing gland of Babbitt metal bearing against said packing and surround the shaft and having a flange, bolts engaged with said last named flange and passing through the first named flange of each bearing, and springs surrounding the bolts and urging the packing gland flange toward the first named flange.

5. In a pit elevator, in combination, a vertically movable jack, a support upon which the jack is mounted for longitudinal adjustment, a jack socket carried by the lower end of the jack, a tubular hub closed at one end and having the closed end disposed through the jack socket, the tubular hub having an annular lubricant containing chamber inward of the jack socket and spaced therefrom, a set screw extending through the jack socket and engaging said hub against rotation, a Babbitt metal sleeve disposed within and fitting the hub and having a plurality of openings in alinement with the chamber, means for holding the sleeve from rotation with reference to the hub, a packing gland at one end of the hub and sleeve, a packing disposed between the gland and the end of the sleeve, and means for forcing the packing gland inward against the packing.

In testimony whereof I hereunto affix my signature.

ORSON W. DUNHAM.